W. T. SEARS.
SHOCK ABSORBER.
APPLICATION FILED JUNE 23, 1915.
1,167,848.
Patented Jan. 11, 1916.
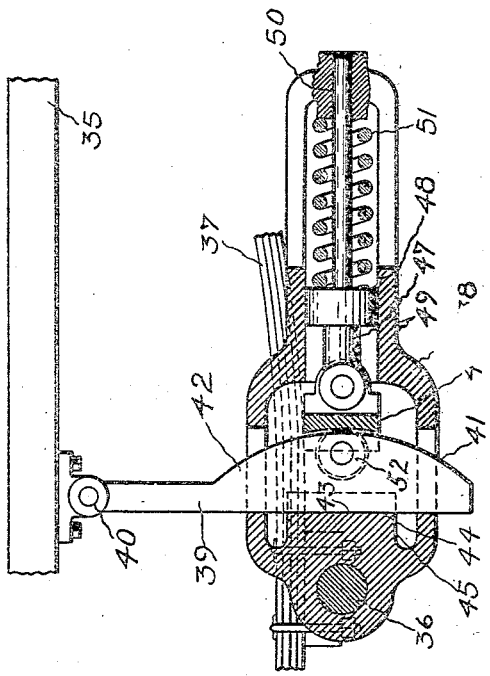
Witnesses
L. L. Markel.
E. E. Campbell
Inventor
W. T. Sears.
By ‑‑‑‑‑‑‑‑
Attorney

UNITED STATES PATENT OFFICE.

WILLARD T. SEARS, OF PHILADELPHIA, PENNSYLVANIA.

SHOCK-ABSORBER.

1,167,848.  Specification of Letters Patent.  Patented Jan. 11, 1916.

Application filed June 23, 1915. Serial No. 35,754.

*To all whom it may concern:*

Be it known that I, WILLARD T. SEARS, a citizen of the United States, residing at Philadelphia, in the county of Philadelphia and State of Pennsylvania, have invented certain new and useful Improvements in Shock-Absorbers, of which the following is a specification.

This invention relates to what are known as "shock absorbers."

While a shock absorber involving my invention can be employed with advantage in a variety of different connections it is of especial utility when incorporated in or forming part of a vehicle such as an automobile. A shock absorber constructed in accordance with my invention has two elements which are relatively movable toward or from a base or center line. I provide a simple and effective means by which said elements can relatively move freely away from the base line, central or initial position with practically no resistance, but wherein the return movement is resisted. This function I prefer to duplicate; that is to say, the same results are secured at opposite sides of the central or initial position of the parts. As will be inferred, the organization is such that I practically eliminate all resistance to movement for a short distance away from the central, then offer but slightly increased resistance on further movement in the same direction away from the central position, but interpose strong resistance to return movement up to a point near the central position when the resistance is practically automatically cut out, this latter relation remaining until there is again a considerable amount of relative movement.

In the drawings accompanying and forming part of the present specification I show in sectional side elevation one of the several convenient forms of embodiment of the invention which will be set forth in detail in the following description. As will be gathered from what I have already stated I do not limit myself to this showing; I may depart therefrom in several respects within the scope of the invention defined by the claims following said description.

It will be assumed that 35 denotes the body of a vehicle such as an automobile, 36 the axle, and 37 a spring interposed between the axle and the body, the axle constituting a part of the running gear of the vehicle. Connected suitably with the axle 36 is the support or bracket 38. Although said support or bracket is shown rigid with the axle, this is not always necessary. Movable with the body or equivalent 35 is the wedge member 39, the shank of said wedge member being pivoted to the body as at 40 and depending therefrom. The wedge member 39 has two wedge portions or faces 41 and 42 usually but not essentially of duplicate construction. These faces merge into each other, the place of mergence being the neutral part of the wedge member, the faces 41 and 42 being opposite or being inclined away from the neutral or central part of the wedge member. The forward face 43 of said wedge member fits a bearing against the flat face 44 of the projection 45 within and constituting a part of the bracket 38, the engagement between the flat faces 43 and 44 being maintained by the shoe element or block 46, the active face of which is curved to approximately agree with and to engage the curved active surface of the wedge member 39. The shoe element or block 46 is pivoted to the stem 47 having a collar 48 slidable in the tubular rearwardly extending portion 49 of the bracket 38, the outer reduced end of the stem 47 being slidable in a guide hole 50 in the extreme or extended end of said bracket 38. The shoe element 46 is constantly forced against the wedge member 39 and the latter in turn against the projection 46 by suitable means as the spring 51 surrounding the rear portion of the stem 47 and bearing against the collar 48 and also against the outer yoke-like end of the bracket 38. At the junction or mergence of the inner ends of the two wedge faces 41 and 42 is an anti-friction roller 52 which is set into the wedge member 42, the periphery of the roller extending at all times slightly beyond the wedge surface of the wedge element 39, so that when the parts are in their neutral positions as represented, the shoe element will engage the anti-friction roller 52, by reason of which resistance between the two parts is cut out or practically cut out when the wedge and shoe elements are in their said neutral or central positions and for a short distance each side of the neutral.

It will be clear that when the body or like part 35 rises, the wedge member 39 is carried therewith, and when a small amount of movement in such direction has been completed, the shoe element 46 will ride off the anti-friction roller 52 and along and down the wedge surface 42 during which motion practically no resistance is offered to the ascent of the body. On the descent of the body, however, to the neutral or central position, the wedge surface 41 by riding along the shoe element 46, or as it might otherwise be stated, by the shoe element riding up said surface 41 or moving from the low toward the high part thereof, encounters resistance which in the construction shown progressively increases until the shoe element 46 engages the anti-friction roller 52 at which point resistance is practically altogether cut out. On downward movement of the body, the conditions described are exactly reversed, there being no resistance offered or practically none during the downward movement from the neutral or central position, although the resistance as represented, is progressively increased as the body rises, the resistance being again cut out or virtually nullified when the central or neutral position is again reached at which time the shoe element 46 will engage the anti-friction roller 52. There may be cases where I may desire to interpose an anti-friction roller between the projection 44 and the wedge member 39.

The wedge element 39 and shoe element 46 present as will be clearly understood, merely one of many different samples of two relatively movable elements in conjunction with which I may provide means by which I can insure the attainment of the objects originally expressed; that is, to practically cut out resistance in the central position, offer but slight resistance to movement away from the central movement in the same direction and then interpose strong resistance on relative return movement of the parts to the neutral position, eliminating such resistance or to all intents and purposes doing so when this neutral position is reached. The invention is not limited to any particular means for obtaining the highly advantageous functions set forth, but the wedge construction in conjunction with the anti-friction roller or equivalent means is eminently satisfactory in this regard.

I have shown a construction wherein the resistance on the relative return of the parts to neutral is resisted in a progressively increasing manner. I do not restrict myself to this feature, although it is of advantage, the invention residing broadly in means for interposing resistance during such time, and this resistance may be either constant or variable depending upon the form of the wedge or other suitably acting means.

What I claim is:

1. A shock absorber comprising a wedge element and a shoe element, the wedge element having two oppositely disposed wedge portions and the shoe element having means connected therewith for urging the same yieldingly toward the wedge element, said wedge element and shoe element being relatively movable toward and from an initial position, and the shoe element being adapted to traverse said wedge portions in alternation on the relative movement of the parts oppositely from said initial position, the wedge element having means associated therewith for approximately cutting out resistance between the wedge and shoe elements when the elements are in said initial position.

2. The combination of a movably mounted wedge element and a shoe element, the two elements being relatively movable toward and from an initial position, the wedge element having two oppositely disposed wedge portions and the shoe element having means for yieldingly urging the same toward the wedge element, the shoe element being adapted to traverse said wedge portions in alternation on the relative movement of the parts in opposite directions from said initial position, the wedge element having means associated therewith for approximately cutting out resistance between the two elements when the same are in said initial position.

3. A shock absorber comprising a wedge element and a shoe element relatively movable toward and from an initial position, the shoe element being adapted to traverse the wedge face of the wedge element on opposite relative movement and the wedge presenting no resistance to the shoe element on relative movement in one direction but presenting resistance on the opposite movement thereof, and means for approximately automatically cutting out the resistance at the conclusion of the relative resisting movement.

4. The combination of a pivotally mounted wedge element and a shoe element, the two elements being relatively movable toward and from an initial position, the wedge element having two oppositely disposed wedge portions and the shoe element having means for yieldingly urging the same toward the wedge element, the shoe element being adapted to traverse said wedge portions in alternation on the relative movement of the parts in opposite directions from said initial position, the wedge element having means associated therewith for approximately cutting out resistance between the two elements when the same are in said initial position.

5. The combination of the body and the running gear of a vehicle, a wedge element connected with one of the vehicle parts, a shoe element connected with the other vehicle part, the shoe element having means connected therewith for urging the same yieldingly toward the wedge element, the two elements being relatively movable toward and from a neutral position on the relative movement of the body of the running gear, the shoe element being adapted to traverse said wedge element in opposite directions on said relative movement, the wedge element presenting no resistance to the shoe element on the relative movement in one direction and offering resistance to the shoe element on the relative movement in the other direction, and means for approximately automatically cutting out the resistance when the neutral position is reached.

In testimony whereof I affix my signature in presence of two witnesses.

WILLARD T. SEARS.

Witnesses:
 H. M. CLEAVER,
 R. S. APGAR.